(12) United States Patent
Smith

(10) Patent No.: US 10,562,713 B2
(45) Date of Patent: Feb. 18, 2020

(54) CONVEYOR SYSTEM AND SUPPORT FRAME THEREFOR

(71) Applicant: CONVEYOR MANUFACTURERS AUSTRALIA PTY LTD., Newcastle, New South Wales (AU)

(72) Inventor: Benjamin John Smith, New South Wales (AU)

(73) Assignee: CONVEYOR MANUFACTURERS AUSTRALIA PTY LTD., Newcastle, New South Wales (AU)

( * ) Notice: Subject to any disclaimer, the term of this patent is extended or adjusted under 35 U.S.C. 154(b) by 0 days.

(21) Appl. No.: 15/519,376

(22) PCT Filed: Oct. 16, 2015

(86) PCT No.: PCT/AU2015/000623
§ 371 (c)(1),
(2) Date: Apr. 14, 2017

(87) PCT Pub. No.: WO2016/058035
PCT Pub. Date: Apr. 21, 2016

(65) Prior Publication Data
US 2017/0225899 A1 Aug. 10, 2017

(30) Foreign Application Priority Data

Oct. 17, 2014 (AU) ................................ 2014904160

(51) Int. Cl.
*B65G 41/02* (2006.01)
*B65G 15/08* (2006.01)
(Continued)

(52) U.S. Cl.
CPC ............. *B65G 41/02* (2013.01); *B65G 15/08* (2013.01); *B65G 15/40* (2013.01); *B65G 39/12* (2013.01); *E21F 13/06* (2013.01); *E21C 27/02* (2013.01)

(58) Field of Classification Search
CPC ...... B65G 41/02; B65G 41/003; B65G 15/08; B65G 15/40; B65G 15/60; B65G 39/12; B65G 21/14; B65G 21/10
(Continued)

(56) References Cited

U.S. PATENT DOCUMENTS 2,514,715 A * 7/1950 Milik .................... B65G 39/10
198/830
4,061,223 A * 12/1977 McGinnis .............. B65G 15/36
198/821
(Continued)

FOREIGN PATENT DOCUMENTS

DE 4116662 A1 11/1992
EP 0375667 A2 6/1990
(Continued)

OTHER PUBLICATIONS

International Search Report dated Nov. 16, 2015 for Application No. PCT/AU2015/000623.
(Continued)

*Primary Examiner* — William R Harp
(74) *Attorney, Agent, or Firm* — Patterson & Sheridan, L.L.P.

(57) ABSTRACT

A support frame for a conveyor system, the support frame comprising: an upright longitudinally extending between an operative lower end and an operative upper end; a cross member extending outwardly from the upright between an upright end and a trolley end, the cross member including a trolley located towards the trolley end of the cross member
(Continued)

and which trolley is operatively adapted to suspend the upright from an overhead rail; and an idler assembly attached to the upright and operatively adapted to support a carry belt portion and a return belt portion of a conveyor belt.

20 Claims, 12 Drawing Sheets

(51) Int. Cl.
*B65G 15/40* (2006.01)
*B65G 39/12* (2006.01)
*E21F 13/06* (2006.01)
*B65G 9/00* (2006.01)
*B65G 15/12* (2006.01)
*B65G 21/02* (2006.01)
*B65G 21/06* (2006.01)
*B65G 21/14* (2006.01)
*B65G 39/04* (2006.01)
*B65G 39/10* (2006.01)
*B65G 41/00* (2006.01)
*E21C 27/02* (2006.01)
*E21F 13/00* (2006.01)
*E21F 17/00* (2006.01)

(58) Field of Classification Search
USPC .......................... 198/812, 594, 861.1, 861.2
See application file for complete search history.

(56) References Cited

U.S. PATENT DOCUMENTS

| | | | |
|---|---|---|---|
| 4,159,757 A | 7/1979 | Kleysteuber et al. | |
| 4,339,031 A | 7/1982 | Densmore | |
| 4,475,648 A * | 10/1984 | Weeks | B65G 39/12 198/830 |
| 4,476,975 A * | 10/1984 | Densmore | B65G 41/02 105/154 |
| 4,771,881 A * | 9/1988 | Roberts | E21D 9/12 105/150 |
| 4,798,279 A | 1/1989 | Doerr et al. | |
| 4,896,764 A * | 1/1990 | Neunzert | B65G 21/14 198/594 |
| 5,657,857 A | 8/1997 | Neilson et al. | |
| 5,997,101 A * | 12/1999 | Peterson | B65G 21/14 198/303 |
| 6,758,326 B1 * | 7/2004 | Benjamin | B65G 21/14 198/594 |
| 8,607,968 B2 * | 12/2013 | Mott | B65G 15/60 198/842 |
| 2002/0187022 A1 | 12/2002 | Horak | |
| 2004/0079621 A1 | 4/2004 | Mott | |

FOREIGN PATENT DOCUMENTS

| | | |
|---|---|---|
| JP | H09 273393 A | 10/1997 |
| SU | 1278280 A1 | 12/1986 |
| WO | 02/02443 A1 | 1/2002 |
| WO | 2008/128291 A1 | 10/2008 |
| WO | 2013/113082 A1 | 8/2013 |

OTHER PUBLICATIONS

Chinese Search Report in related application 100080 dated Aug. 31, 2018.
EPO Exam Report in related application 15851205.3 dated Sep. 24, 2018.
Chinese OA in related application CN201580066781.7 dated May 7, 2019.
Australian Office Action in related application AU 2015333576 dated Sep. 10, 2019.

* cited by examiner

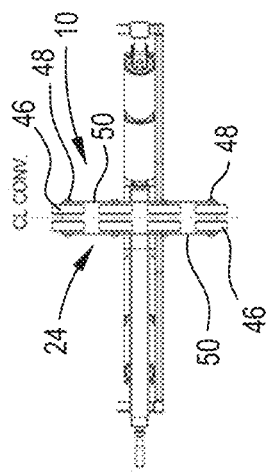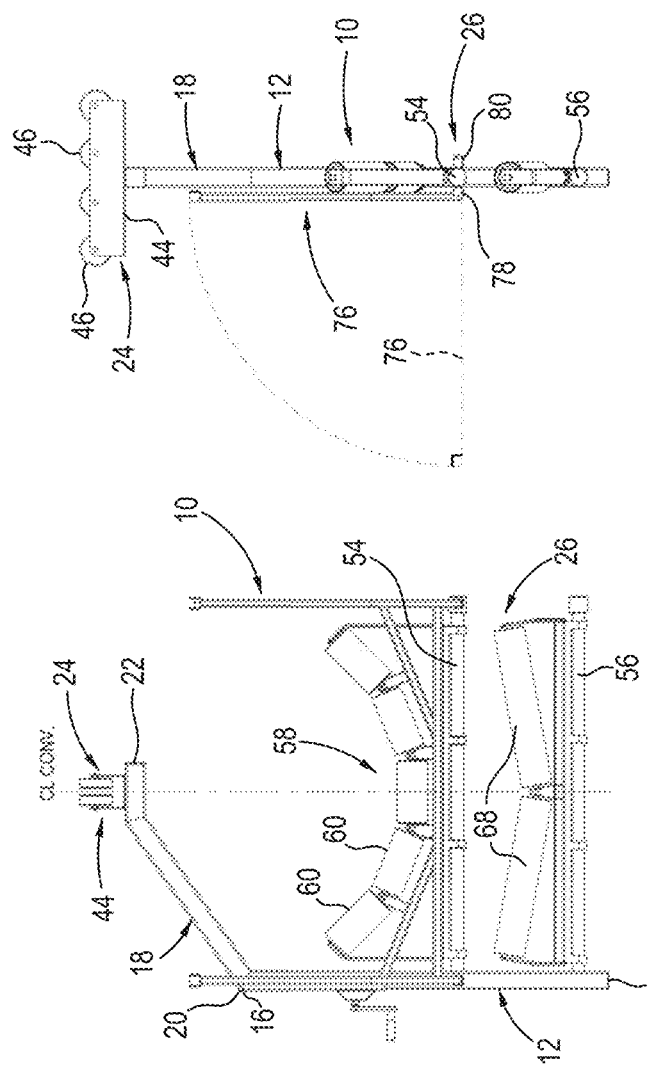

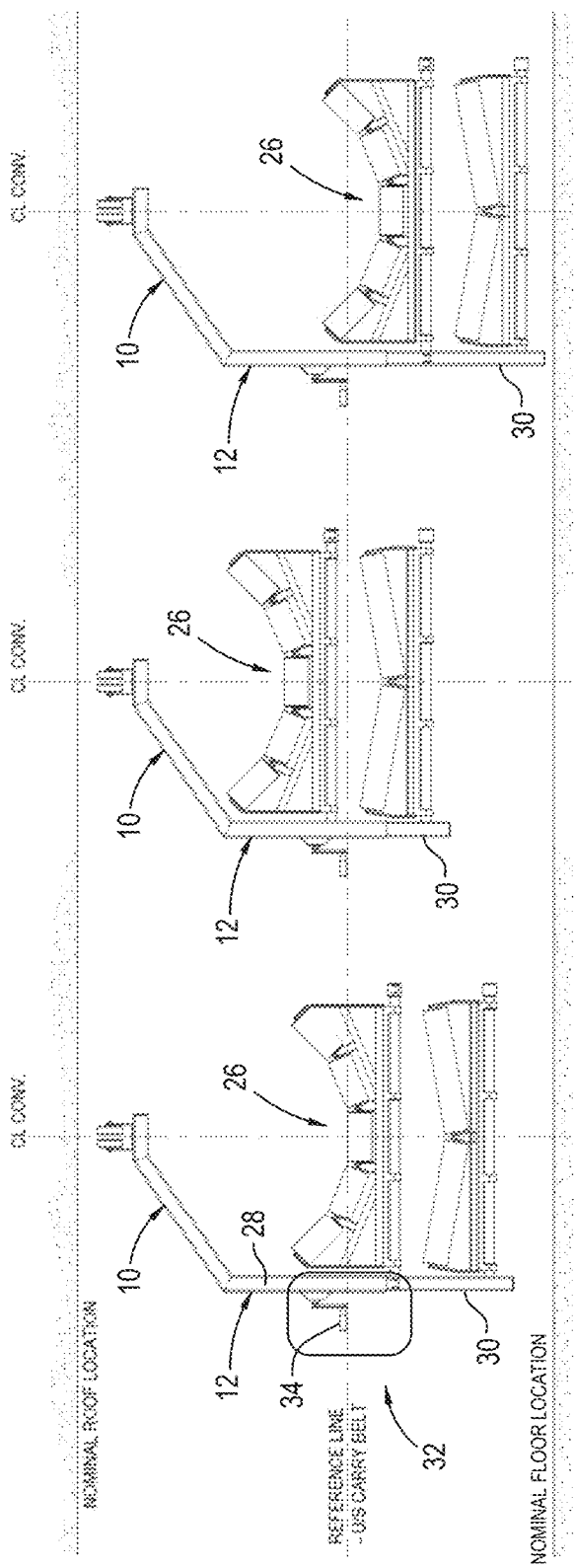
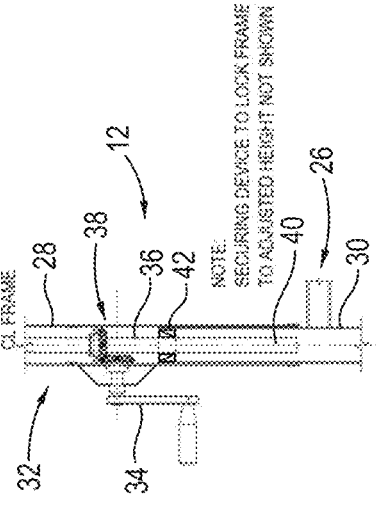

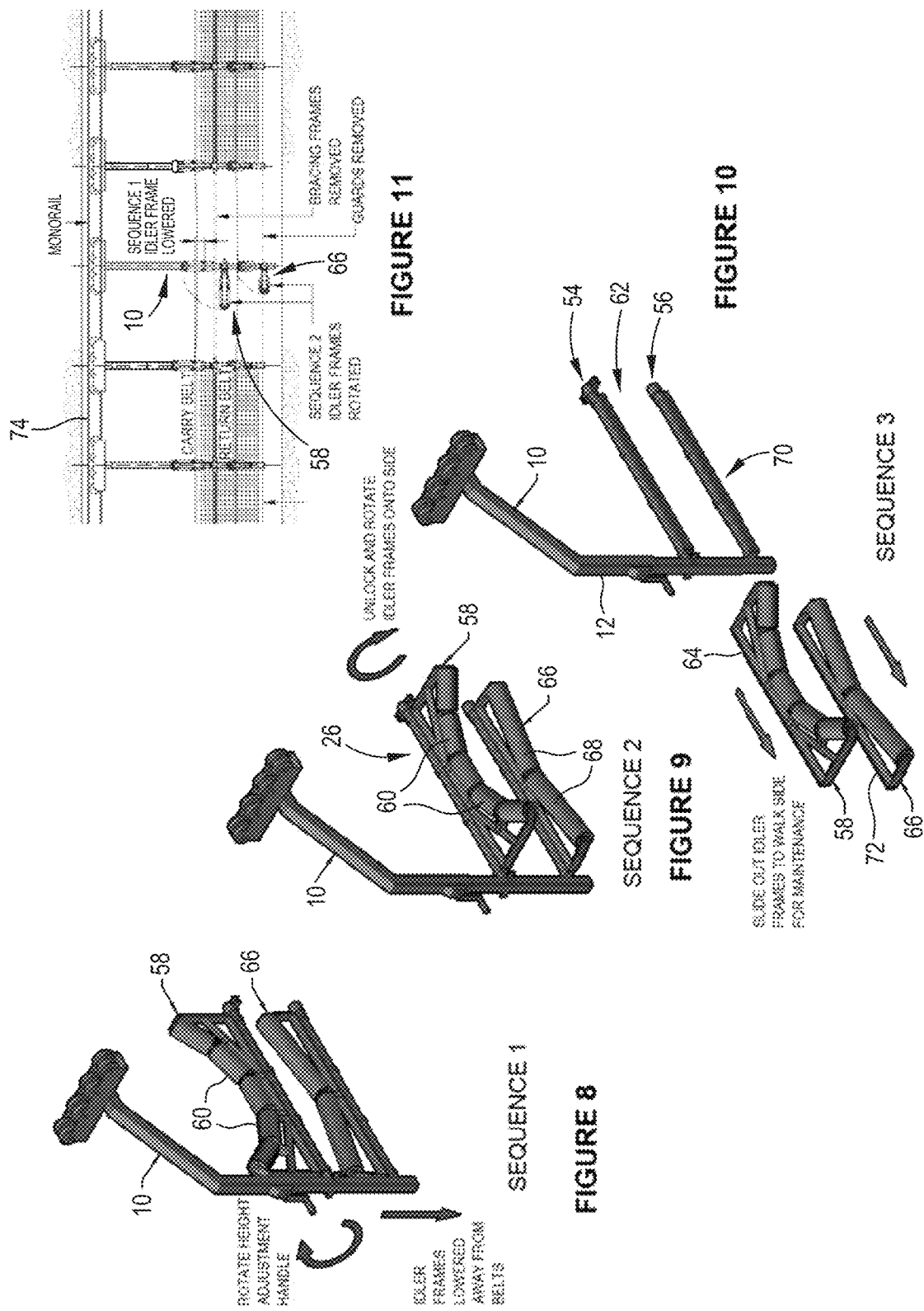

CONVEYOR SYSTEM AND SUPPORT FRAME THEREFOR

CROSS-REFERENCE TO RELATED APPLICATIONS

This application claims the benefit of and priority to Australian Provisional Patent Application No. 2014904160, filed 17 Oct. 2014, the entire disclosure of which is incorporated by reference herein.

FIELD

The invention concerns a conveyor system and a support frame therefor. In one particular but non-exclusive aspect the invention concerns a conveyor system for use in underground mining operations.

BACKGROUND

Various known conveyors are employed in underground mining operations. Such conveyors are normally of a type comprising an endless belt in which the belt moves in one direction when it is carrying mined material with the belt running in the opposite direction when it changes from the return path to the load bearing path. In order to form a belt path and to support both the weight of the belt and the weight of the payload an elaborate assembly of load bearing and guide rollers are required. The rollers are typically supported on frames that are located at discrete intervals and anchored to the underground tunnels. The frames may rest on the mining floor or be suspended from the roof by chains or from a wall by brackets to achieve the required stability.

As underground mining operations progress it is often necessary either to lengthen or shorten a conveyor. One example where this is required is in a longwall mining operation. There are two basic forms of longwall mining operation, namely advancing face and retreating face systems. An advancing face, as the term suggests, advances together with its roadways deeper into the area of material being mined. A retreating face on the other hand starts at the furthest point required in the area of material to be extracted and retreats towards the entrance.

Although loop take-up arrangements are known for facilitating lengthening and shortening of belts associated with such conveyors, the addition or removal of frames necessary to support the rollers associated with the conveyor system is a time consuming process. This process is also hazardous as the frames must be carried up and down the tunnels through which the conveyor passes, often whilst the conveyor is in operation. Also, erecting and collapsing roller support frames is time consuming and results in down time for and damage to mining and tunnelling projects. A further drawback of existing conveyors is the fact that replacement of worn or failed components is a heavy and awkward task. This is particularly true if the conveyor is loaded with mined material as the combined weight of the belting and material can be significant. The difficultly is exacerbated by the confined areas in which installation, recovery and maintenance is to be carried out.

Various safety standards are prescribed for conveyor systems. Often, however, mining entities are guilty of non-compliance with those standards for failure to provide sufficient guarding of conveyor systems in underground mines. The reason for this is that guarding of conveyor systems would typically require punched steel sheeting or welded mesh panels to be installed. Given the above ergonomic constraints, carrying, installation and recovering panels of mesh only adds to already existing handling difficulties.

OBJECT

It is the object of the present invention to substantially overcome or at least ameliorate one or more of the above disadvantages, or at least to provide a useful alternative.

SUMMARY

According to a first aspect of the present invention there is disclosed herein a support frame for a conveyor system, the support frame comprising:

an upright longitudinally extending between an operative lower end and an operative upper end;

a cross member extending outwardly from the upright between an upright end and a trolley end, the cross member including a trolley located towards the trolley end of the cross member and which trolley is operatively adapted to suspend the upright from an overhead rail; and an idler assembly attached to the upright and operatively adapted to support a carry belt portion and a return belt portion of a conveyor belt.

Preferably the upright comprises a first upright member and a second upright member telescopically coupled to the first upright member.

Preferably the upright includes an adjustment mechanism adapted to provide longitudinal adjustment of the first upright member relative to the second upright member.

Preferably the trolley includes a trolley body which supports at least one pair of opposing wheels.

Preferably the trolley includes four pairs of opposing wheels.

Preferably the idler assembly comprises an elongate carry belt idler shaft transverse to the upright.

Preferably the idler assembly comprises an elongate return belt idler shaft parallel and co-extensive with the carry belt idler shaft.

Preferably the idler assembly includes a carry belt idler frame supporting a number of carry belt idlers.

Preferably the carry belt idler shaft includes a carry belt idler frame attachment formation adapted to slidably engage a complimentary carry belt idler shaft attachment formation of the carry belt idler frame.

Preferably the carry belt idler frame attachment formation is pivotally mounted about the carry belt idler shaft allowing the carry belt idler frame to be located in an upright support position and in a horizontal position.

Preferably the idler assembly includes a return belt idler frame supporting a number of return belt idlers.

Preferably the return belt idler shaft includes a return belt idler frame attachment formation adapted to slidably engage a complimentary return belt idler shaft attachment formation of the return belt idler frame.

Preferably the return belt idler frame attachment formation is pivotally mounted about the return belt idler shaft allowing the return belt idler frame to be located in an upright support position and in a horizontal position.

Preferably the support frame includes a brace operatively adapted to secure the support frame to an adjacent support frame.

Preferably the brace is pivotally attached to the carry belt idler shaft so as to be movable between an operative horizontal orientation and a stowaway upright position.

Preferably the support frame includes a support arm pivotally attached to the cross member so as to be movable between an upright stowaway position and an operative horizontal position.

Preferably the support arm comprises a first arm member and a second arm member telescopically coupled to the first arm member.

According to a second aspect of the invention there is disclosed herein a support frame assembly comprising a first and a second support frame in accordance with the first aspect, the first and second support frames being suspended from an overhead rail, wherein the first support frame is secured to the second support frame by the brace.

Preferably the support assembly includes a guard extending between the upright of the first and the second support frame so as to overlie the idler assemblies at least partially.

According to a third aspect of the invention there is disclosed herein a conveyor assembly comprising a plurality of support frames in accordance with the first aspect suspended from a monorail, the monorail have a conveyor support section supporting a conveyor belt and a recovery/installation section orientated in a direction transverse to the conveyor support section.

According to a fourth aspect of the present invention there is disclosed herein an idler assembly for a conveyor system, the idler assembly comprising:
a shaft having an idler frame attachment formation; and
an idler frame operatively associated with the shaft and supporting at least one idler;
the idler frame having a shaft attachment formation adapted for attachment to the frame attachment formation,
wherein the frame attachment formation is adapted for pivotal movement about the shaft so as to move the idler frame between (i) a support position for operative support of a conveyor belt and (ii) a release position for removing the idler frame from the shaft.

The invention extends to an idler from for the idler assembly of the fourth aspect.

BRIEF DESCRIPTION OF THE DRAWINGS

Preferred embodiments of the invention will be described hereinafter, by way of examples only, with reference to the accompany drawings, wherein:

FIG. 1 is a front view of an embodiment support frame;
FIG. 2 is a side view of the embodiment support frame;
FIG. 3 is a top view of the embodiment support frame;
FIG. 4 is a front view of the embodiment support frame with its idler assembly in a neutral position;
FIG. 5 is an enlarged sectional view of a portion of the embodiment support frame;
FIG. 6 is a front view of the embodiment support frame with its idler assembly in a raised position;
FIG. 7 is a front view of the embodiment support frame with its idler assembly in a lowered position;
FIG. 8 is a perspective view of the embodiment support frame of the idler assembly in an upright support position;
FIG. 9 is a perspective view of the support frame of FIG. 8 wherein the idler assembly is located in a horizontal position;
FIG. 10 is a perspective view of the support frame of FIG. 8 wherein the idler assembly has been removed from an upright of the support frame;
FIG. 11 is a side view of a number of installed support frames.

DESCRIPTION OF PREFERRED EMBODIMENTS

Figure 10A:
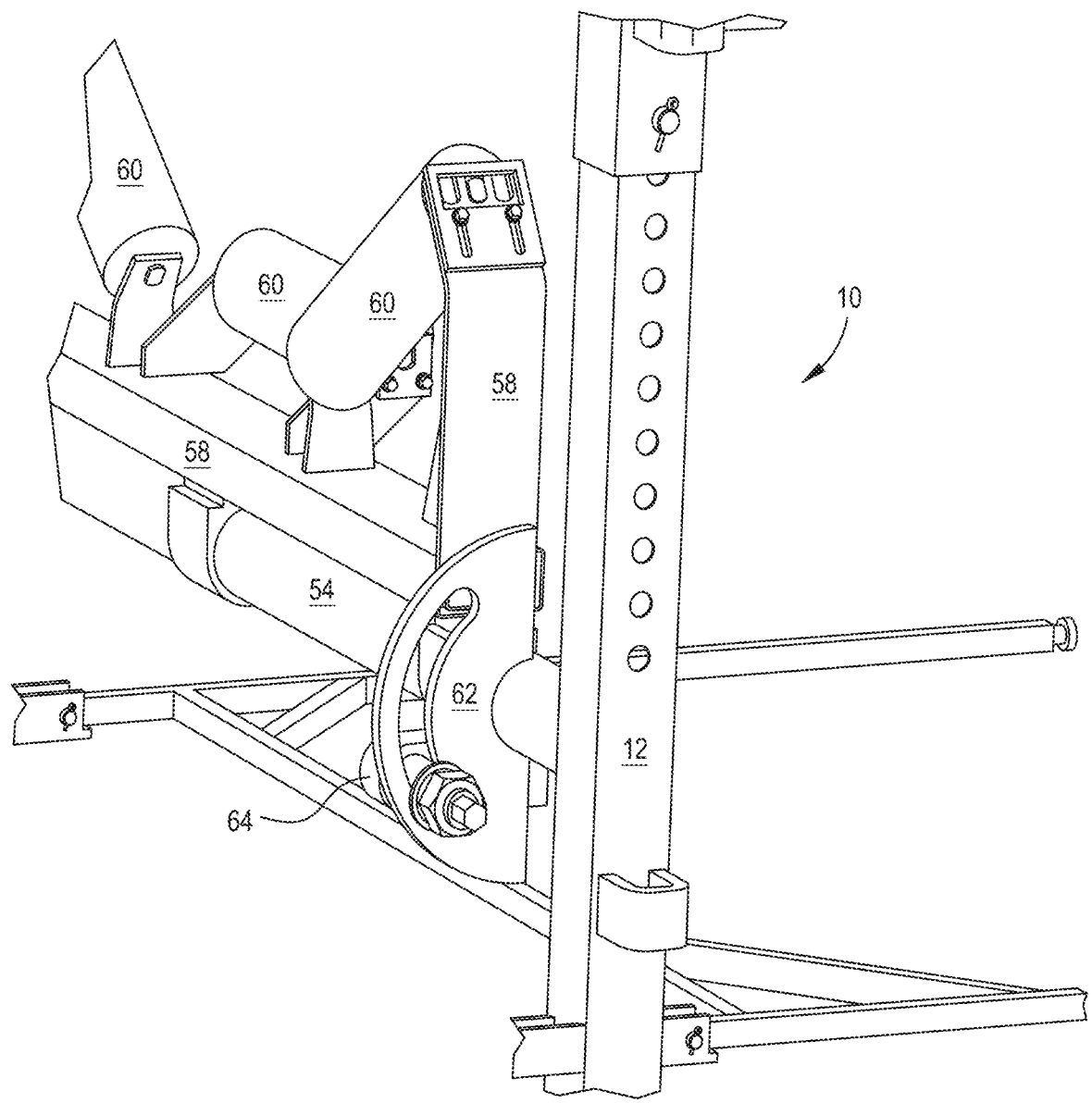
FIG. 10a is an enlarged perspective view of a portion of the support frame of FIG. 8.

FIGS. 1 to 3 show an embodiment support frame 10 for an underground conveyor system. The support frame 10 comprises an upright 12. The upright 12 extends longitudinally between an operative lower end 14 and an operative upper end 16. The support frame 10 further includes a cross member 18 which extends outwardly from the upright 12 between an upright end 20 and a trolley end 22. The cross member 18 includes a trolley 24 located towards the trolley end 22 of the cross member 18. The trolley 24 is operatively adapted to suspend the upright 18 from an overhead rail. The support frame 10 also includes an idler assembly 26 attached to the upright 12 and operatively adapted to support a carry belt portion and a return belt portion of conveyor belt as discussed below.

Referring also to FIGS. 4 to 7, the upright 12 comprises a first upright member 28 and a second upright member 30 telescopically coupled to the first upright member 28. As shown, a portion of the second upright member 30 is slidably received and held within the first upright member 28. To adjust the height of the idler assembly 26 so as to be located in an operative position to support a conveyor belt, the upright 12 includes an adjustment mechanism 32. The adjustment mechanism 32 is adapted to provide longitudinal adjustment of the second upright member 30 relative to the first upright member 28.

As shown in FIG. 5, the adjustment mechanism 34 includes an adjustment handle 34 providing a crank operatively attached to a transmission assembly 36 for converting pivotal movement of the adjustment handle 34 into translational movement of the second upright member 30 relative to the first upright member 28. The transmission assembly 36 includes a bevel gear assembly 38 which imparts pivotal movement to a first threaded transmission member 40. The first threaded transmission member 40 threadingly engages a second threaded transmission member 42 fixed in position on the second upright member 30 such that pivotal movement of the first threaded transmission member 40 will cause the second threaded transmission member 42 to undergo translational movement within the first upright member 28 and, as a result, the second upright member 30 undergoes longitudinal adjustment relative to the first upright member 30.

Referring to FIGS. 1 to 3, the trolley 24 includes a U-shaped trolley body 44 which supports 4 pairs of opposing wheels 48. Each wheel 48 is secured to a side wall 50 of the trolley body 44 by a wheel shaft 52. The embodiment trolley 24 is configured so as to engage an overhead monorail having a cross-section of substantially I-shape.

The idler assembly 26 comprises an elongate carry belt idler shaft 54 transverse to the upright 12. In this embodiment the carry belt idler shaft 54 is cantilevered from the second upright member 30. The idler assembly 26 further comprises an elongate return belt idler shaft 56 that is parallel and co-extensive with the carry belt idler shaft 54. The return belt idler shaft 56 is also cantilevered from the second upright 30.

Referring also to FIGS. 8 to 10, the idler assembly 26 includes a carry belt idler frame 58 supporting a number of carry belt idlers 60, here 5 carry belt idlers. The carry belt idler shaft 54 includes a carry belt idler frame attachment formation 62 adapted to slidably engage a complimentary carry belt idler shaft attachment formation 64 of the carry belt idler frame 58. The carry belt idler frame attachment formation 62 is pivotally mounted about the carry belt idler shaft 54, allowing the carry belt idler frame 58 to be located in an upright support position, shown in FIG. 8, and a release, in this embodiment horizontal, position shown in FIG. 9. It will be understood that for different belt orientation different release and support positions may be required.

The idler assembly 26 further includes a return belt idler frame 66 supporting a number of return belt idlers 68, here two return belt idlers. The return belt idler shaft 56 includes a return belt idler frame attachment formation 70 adapted to slidably engage a complimentary return belt idler shaft attachment formation 72 of the return belt idler frame 66. The return belt idler frame attachment formation 70 is pivotally mounted about the return belt idler shaft 56, allowing the return belt idler frame 66 to be located in an upright support position, shown in FIG. 8, and a horizontal position, position shown in FIG. 9.

FIG. 8 schematically illustrate sequential steps in removing the carry belt idler frame 58 and the return belt idler frame 66 for maintenance or repair. It will be noted from FIG. 10 that the support frame 10, with the carry belt idler frame 58 and the return belt idler frame 66 has been removed, has a substantially E-shape with the upright 12 providing the vertical leg of the "E" and the cross member 18, the carry belt idler shaft 54 and the return belt idler shaft 56 providing the three horizontal legs of the "E".

FIG. 10A shows the support frame 10 having a slide-out mechanism to remove the carry belt idler frame 58 from the support frame 10 for maintenance or repair.

FIG. 11 depicts a support frame 10 suspended from a monorail 74 undergoing in situ replacement of its carry belt idler frame 58 and return belt idler frame 66.

Referring to FIG. 2, support frame 10 includes a brace 76 operatively adapted to secure the support frame 10 to an adjacent support frame. The brace 76 is pivotally attached to the carry belt idler shaft 54 at attachment points 78. The brace 76 is movable between an operative horizontal orientation, shown in broken lines in FIG. 2, and a stowaway upright position. The support frame 10 includes coupling points 80 opposing the attachment point 78. A brace 76 of an adjacent support frame 10 may be secured to the coupling points 80.

Figure 13:
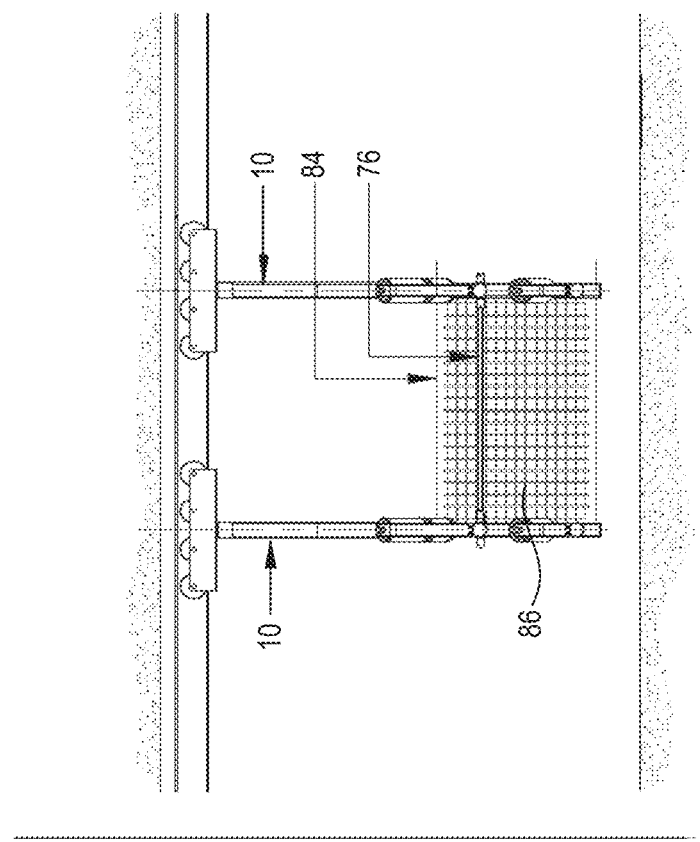
FIG. 13 is a side view of two coupled support frames.
Figure 12:
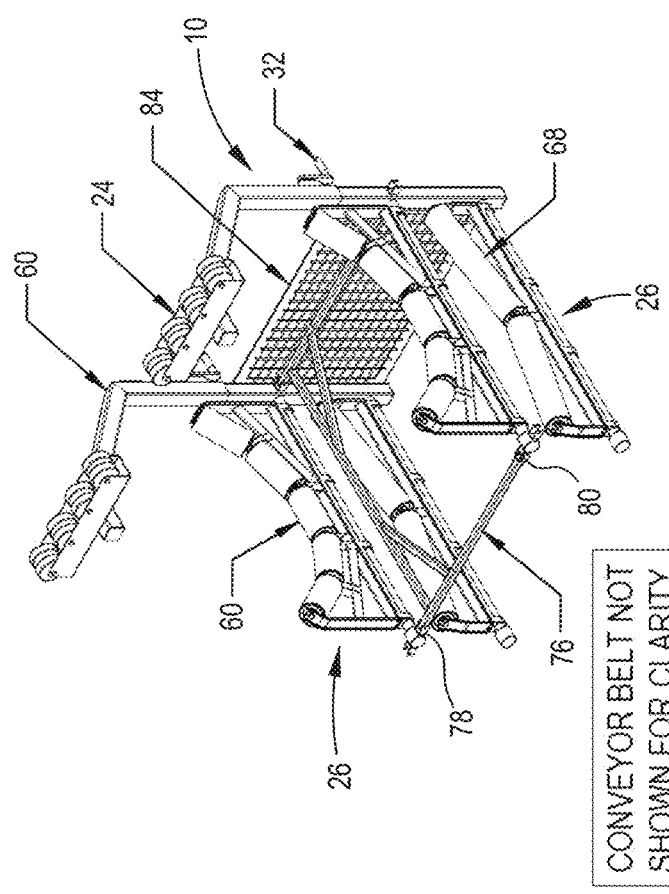
FIG. 12 is a perspective view of two coupled support frames.

A support frame assembly 82 wherein two support frames 10 are coupled are depicted in FIGS. 12 and 13. The support assembly 82 includes a guard 84 extending between the upright 12 of the first and the second support frame 10 so as to overlie the idler assemblies 26 at least partially. In this embodiment the guard 84 includes a mesh 86 to deter mining personal accidentally coming into contact with spinning idlers.

Figure 15:
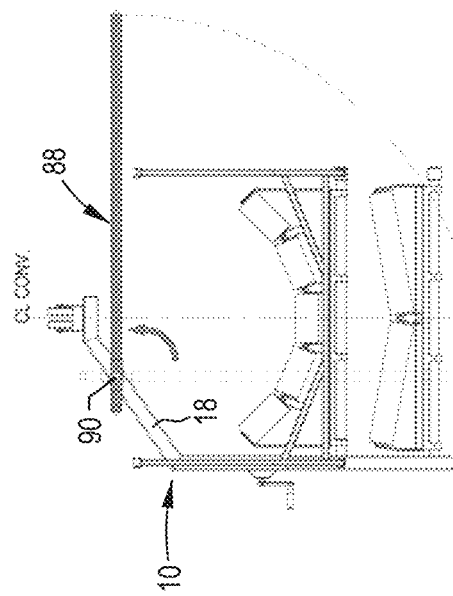
FIG. 15 is a front view of the support frame of FIG. 14 with the support arm in a horizontal position.
Figure 14:
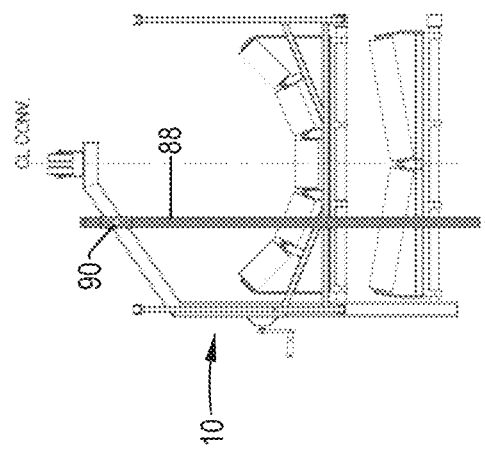
FIG. 14 is a front view of a support frame with a support arm.
Figure 16:
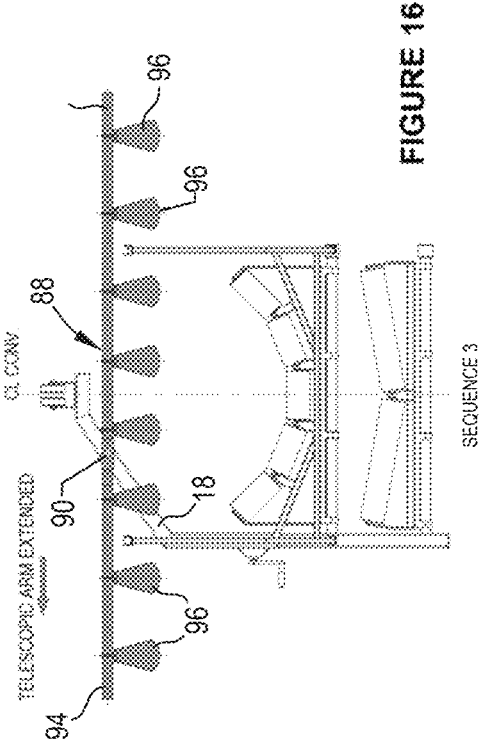
FIG. 16 is a front view of the support frame of FIG. 14 with the support arm in an extended position.

Referring to FIGS. 14 to 16, the support frame 10 includes a support arm 88 pivotally attached via a rotating pin 90 to the cross member 18. The support arm 88 is movable between an upright stowaway position, shown in FIG. 14, and an operative horizontal position, shown in FIG. 15. The support arm 88 comprises a first arm member 92 and a second arm member 94 telescopically coupled to the first arm member. FIG. 16 shows the support arm 88 in a telescopically extended position and supporting a plurality of stone dust bags 96.

Figure 17:
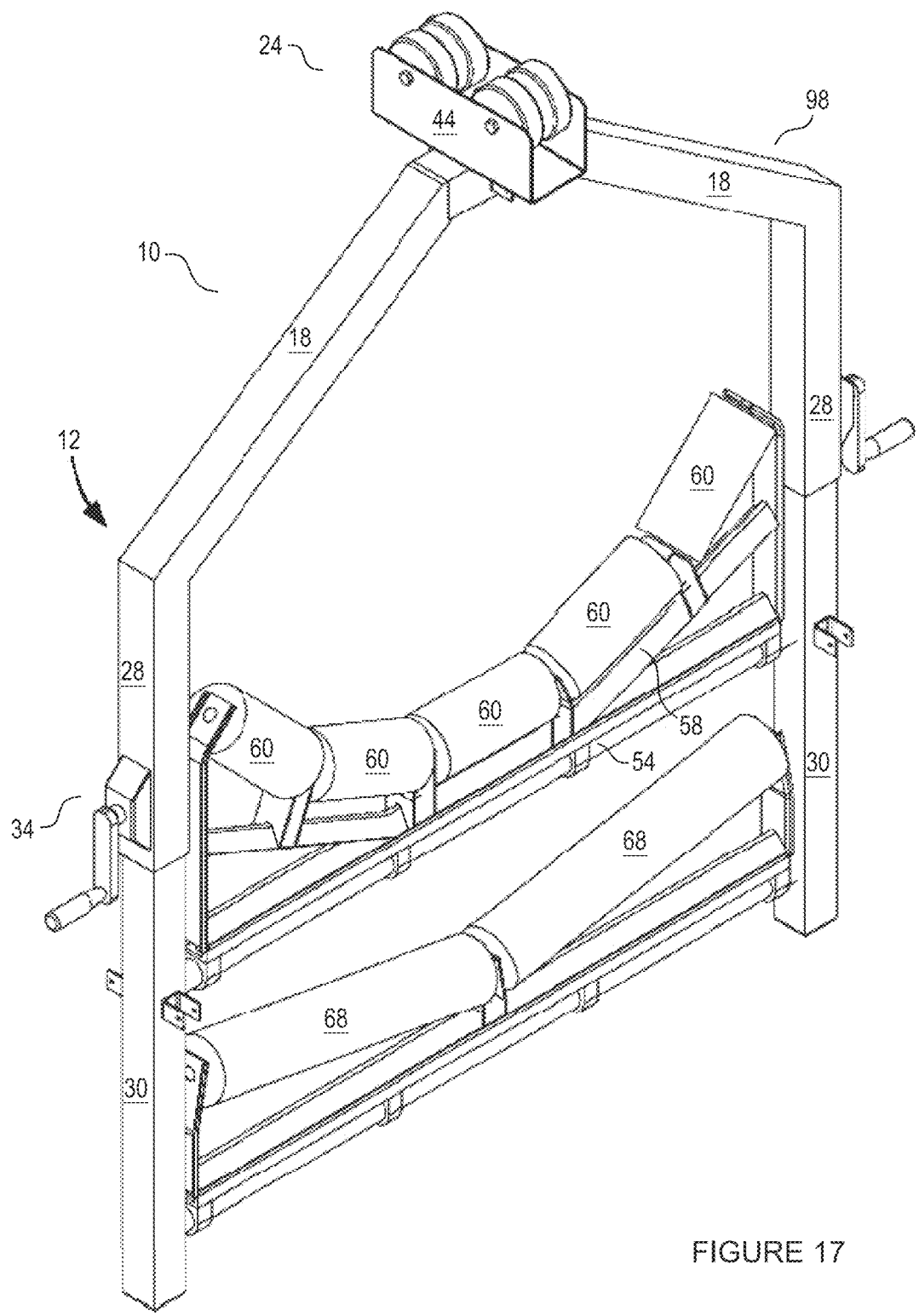
FIG. 17 is a perspective view of a support frame with a support frame reinforcing member.

There may be instances where the weight of the payload of a belt conveyer may be of such magnitude as to necessitate the weight bearing ability of the upright 12 to be reinforced. This is achieved by providing a support frame reinforcing member having a substantially inverted C-shape. i.e., a "⊃" shape. FIG. 17 shows a ⊃-shaped support frame reinforcing member 98 which includes non-illustrated attachment formation for securing the support frame 10 thereto. With the support frame 10 and the support reinforcing member 18 coupled a support frame is provided having a substantially A-shape.

Figure 19:
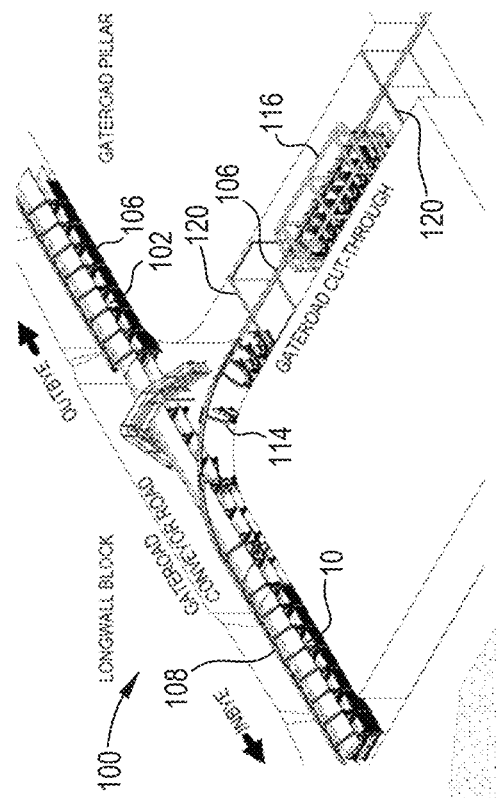
FIG. 19 is a perspective view of the conveyor system of FIG. 18.
Figure 18:
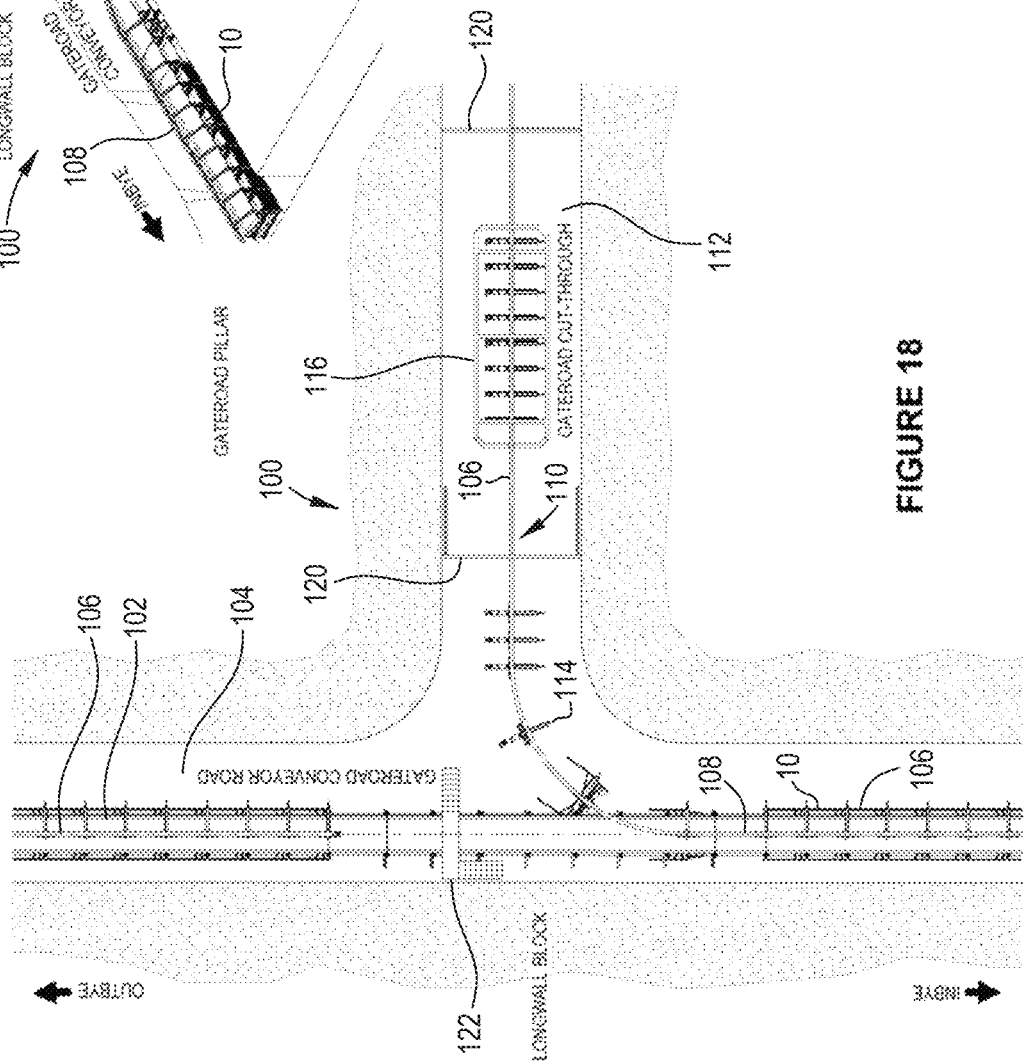
FIG. 18 is a top view of an embodiment conveyor system.
Figure 20:
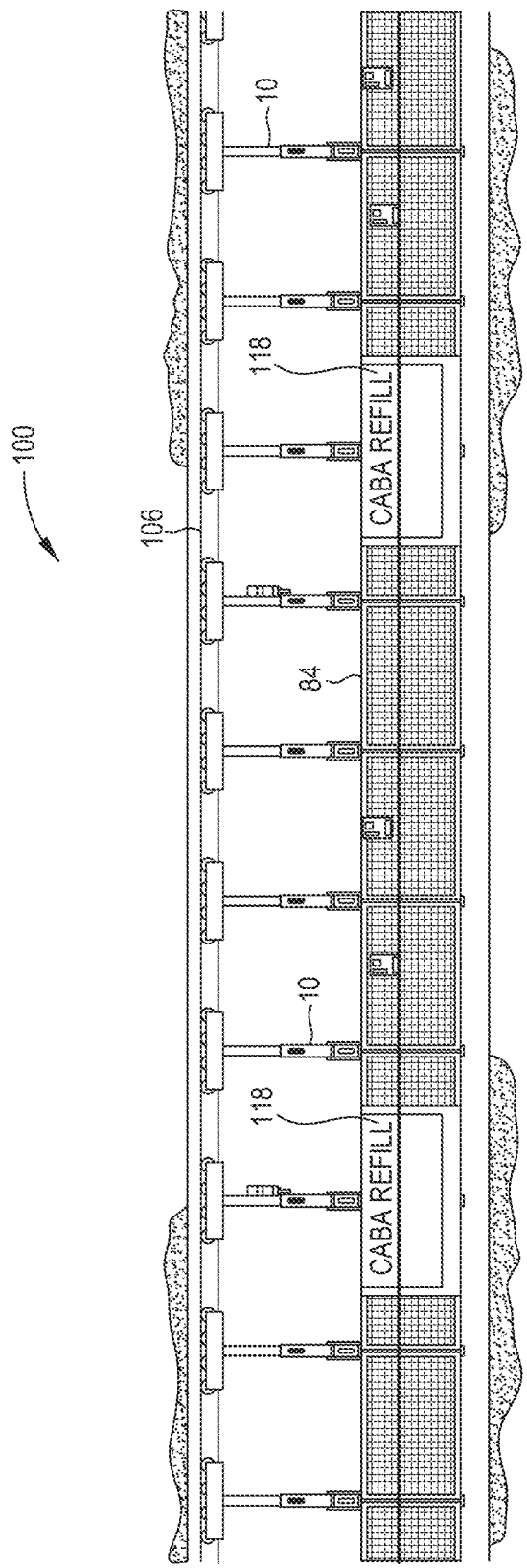
FIG. 20 is a side view of a plurality of coupled support frames.

FIGS. 18 and 19 show an embodiment conveyor system 100. The conveyor system 100 comprises a conveyor belt 102 which extends along a gateroad 104. The belt conveyer 102 is supported by a plurality of support frames 10 which are suspended from an overhead monorail 106. The monorail 106 includes a conveyor support portion 108 which extends along the length of the gateroad. The monorail 106 further includes a recovery/installation section 110 which extends along the length of a gateroad cut-through. The monorail 106 further includes a curved intermediate section 114 connecting the conveyor support portion 108 with the recovery/installation section 110.

The conveyor system 100 is installed from a common location in a mine, in this embodiment from the gateroad cut-through where a plurality of support frames 10 is stored in a transport sled 116. The transport sled 116 is adapted to be rolled to different locations in the mine. A support frame 10 is readied by locating the carry belt idler frame 58 and the return belt idler frame 66 in their respective horizontal positions (shown in FIG. 9). The support frame 10 is now driven from the recovery/installation section 110 of the monorail 106 and along the intermediate section 114. With the carry belt idler frame 58 and the return belt idler frame 66 in their horizontal positions, they are allowed to pass in between the operating conveyor belt 102 without interfering therewith. The support frame 10 can now be driven along the conveyor support portion 108 of the monorail 106 to a desired location.

Figure 21:
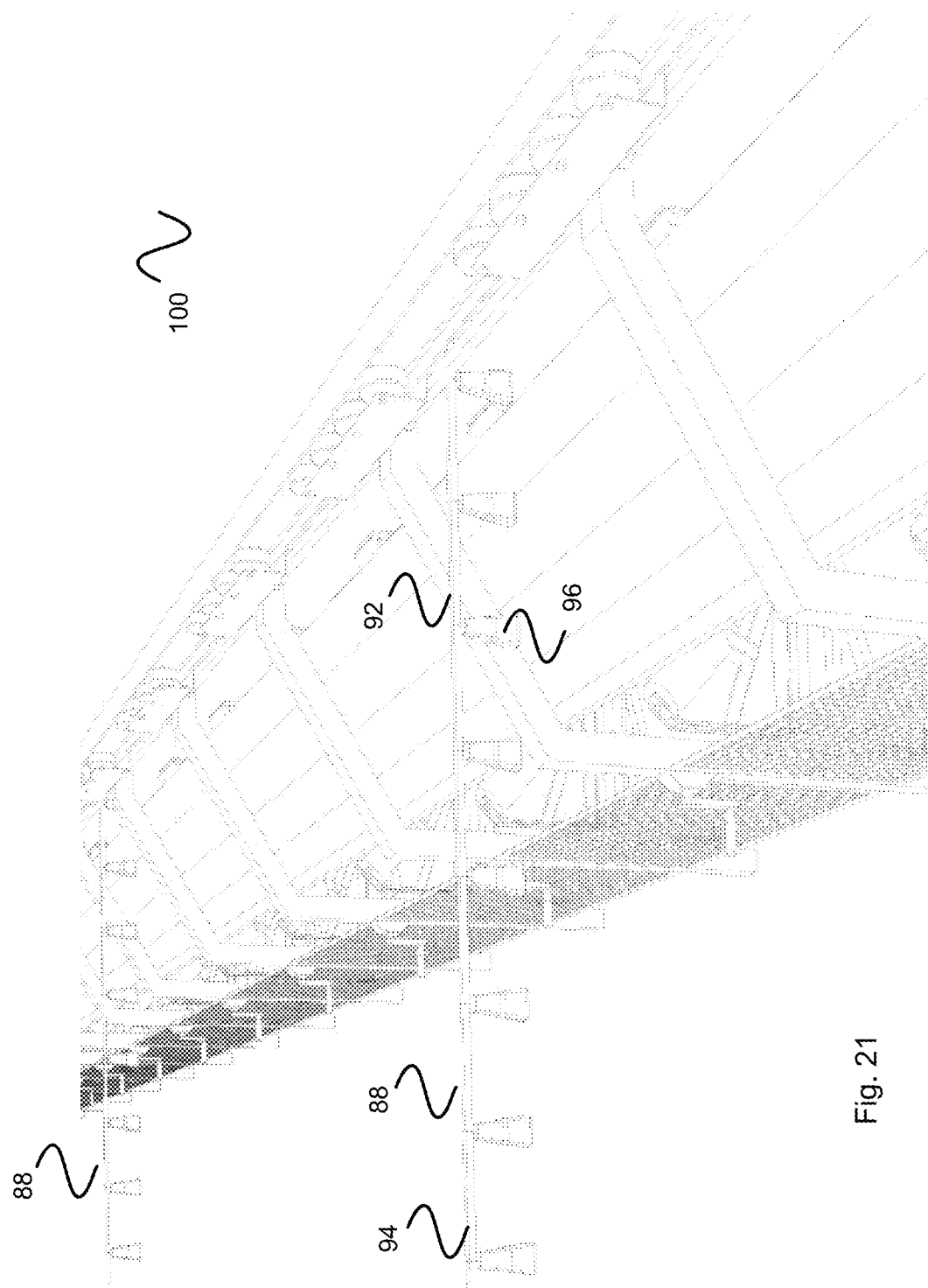
FIG. 21 is a perspective view of a portion of the conveyor system having a plurality of horizontal support arms.

Once in position, the support frame 10 is connected to a preceding (inbye) support frame 10 by way of the brace 76. The brace 76 is designed to provide flexural rigidity to the conveyor system 100 (about a vertical axis). The carry belt idler frame 58 and the return belt idler frame 66 are now returned to their upright support portion, but without making contact with the moving conveyor belt 106. The second upright member 30 is hereafter telescopically adjusted in an upward direction by operation of the adjustment mechanism 32 until the idlers 60 of the carry belt idler frame 58 engage a carry belt section of the conveyor belt 102 and the idlers 68 of the return belt frame 66 engage a return belt section of the conveyor belt 102. Guards 84 can now be secured between adjacent support frames 10, see FIG. 23, with suitable fasteners. Associated non-illustrated signal lines, pull cord lanyards, electrical cables, piping and hosing, lighting and emergency response equipment can now also be installed and attached to the system. The conveyor system 100 also includes compressed air breathing apparatus (CABA) refill stations. As shown in FIG. 21, the conveyor system 100 includes a plurality of support arms 88 in position and supporting stone dust bags 96. It will be understood that the dust bags could be replaced with water tubs which are also used for explosion suppression.

Should a failure occur in an idler, the conveyor system 100 can allow for safe and efficient replacement of components.

When an idler has failed, signal lines, lanyards etc. are temporarily secured out of the way, generally on the support frame 10. The guards 84 on either side of the relevant support frame 10 are removed and stood aside. The second upright member 30 of the support frame 10, and associated carry belt idler frame 58 and return belt idler frame 66, are lowered away from the conveyor belt 102 using the adjustment mechanism 32. The carry belt idler frame 58 and return belt idler frame 66 are now located in their horizontal positions. Once in their horizontal positions, the carry belt idler frame 58 and return belt idler frame 66 are slid out into the walkway exposing all idlers. The failed idler can now be replaced in the walkway away from the moving conveyor belt 102 and clear of any restricted spaces and with awkward reaches and other components. When the idler has been replaced, the process is carried out in reverse.

During production operations, it is necessary to continually shorten the conveyor system 100. Traditionally this has required that the conveyor belt be stopped, isolated, manually de-constructed and structure and components removed, before re-energizing and re-starting the conveyor belt. The embodiment conveyor system 100 addresses this problem by allowing it to be continually shortened without having to stop production in order to do so. As the inbye (towards the face) end is fixed and rigid, individual support frames are recovered and removed from the conveyor at the other end (at the recovery/installation section 110). The opposite procedure is followed for the installation process.

Inspections of conveyor systems are frequently undertaken during the day. At times such inspections will reveal that a component has failed, typically an idler. This situation can create a serious risk of fire and/or conveyor belt damage. If the failure is severe enough, the conveyor must be stopped in order to remedy the situation. Once people, parts and other lifting equipment have been mobilized and the part replaced, several production hours will have been lost.

The embodiment conveyor system allows personnel, upon discovering a critical failure which could cause severe damage or cause a serious fire risk, to remedy the failure without halting the production process.

Referring to FIGS. 18 and 19, the conveyor system 100 includes double machine doors 120 to prevent short-circuiting of ventilating air. The conveyor system 100 also includes a personnel crossover 122.

Figure 23:
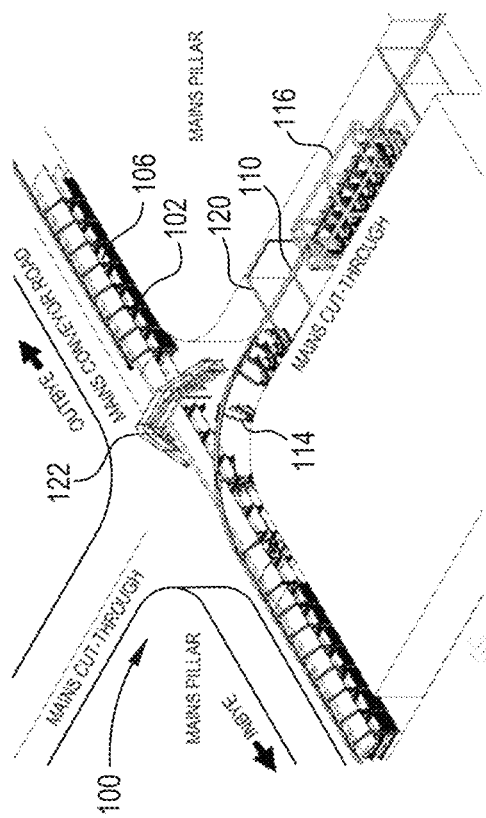
FIG. 23 is a perspective view of the conveyor system of FIG. 22.
Figure 22:
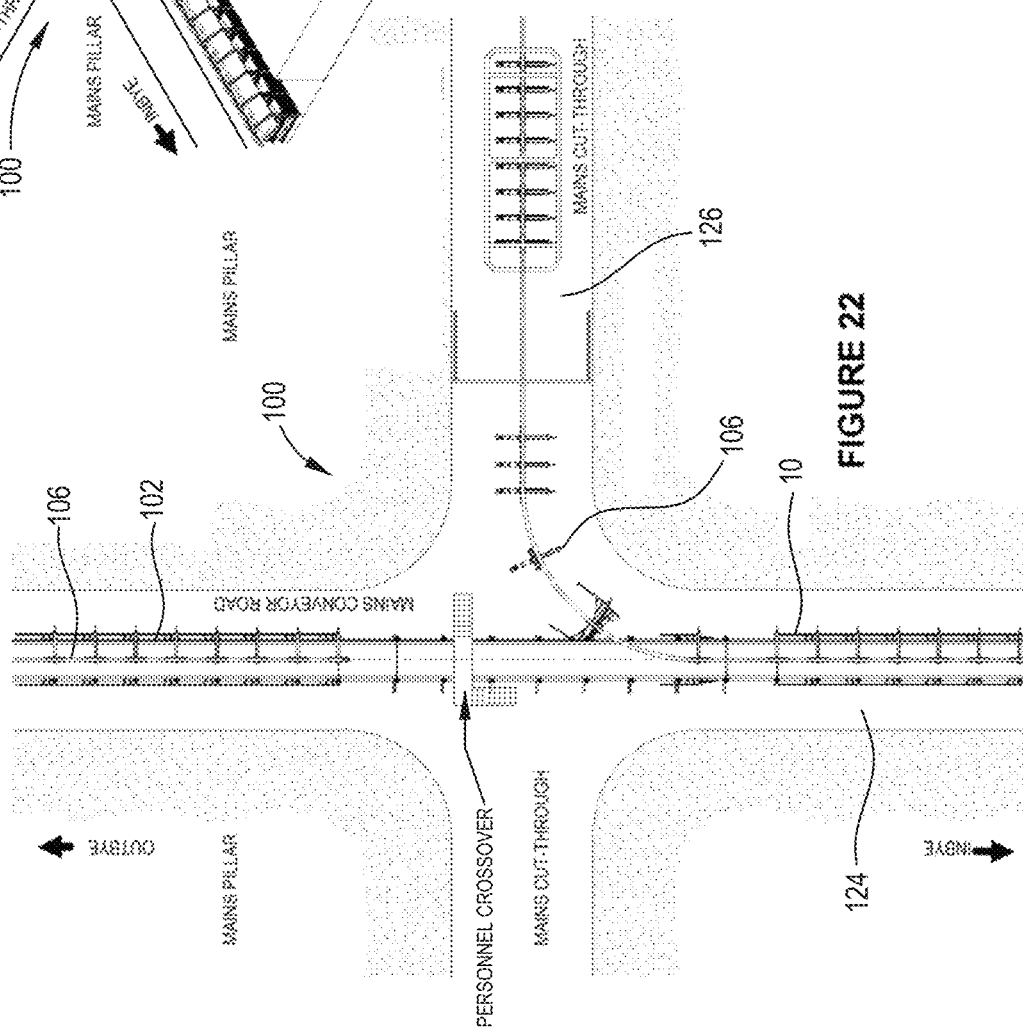
FIG. 22 is a top view of a second embodiment conveyor system.

FIGS. 22 and 23 show an alternative conveyor system 100 wherein the conveyor belt 102 extends along a mains conveyor road 124. In this case the monorail 106 curves into a mains cut-through 126.

Figure 24:
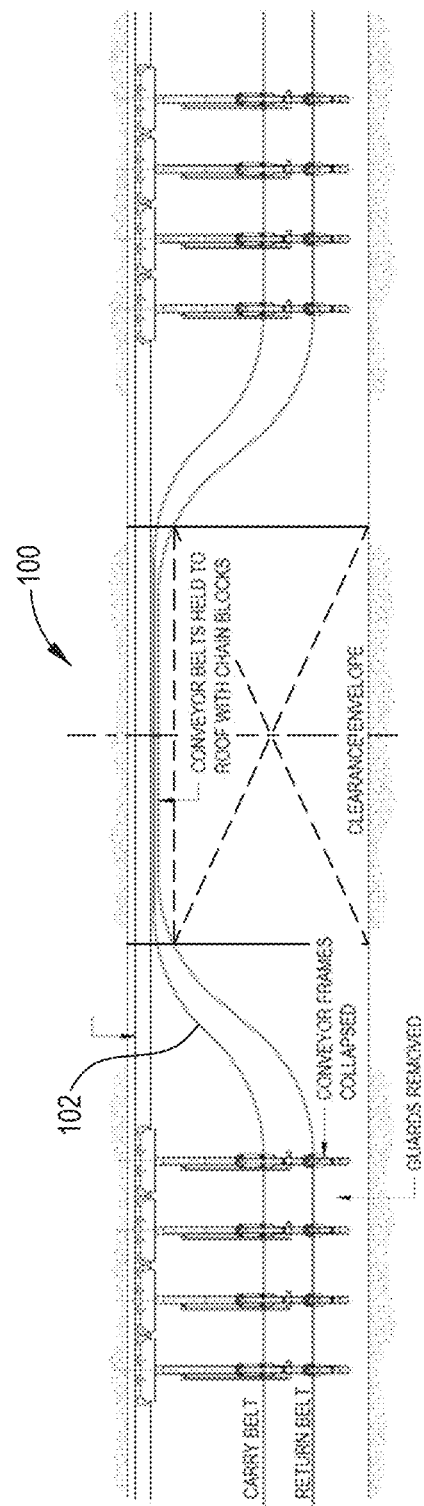
FIG. 24 is a side view of a conveyor system having a conveyor belt suspended with chain blocks.

FIG. 24 shows the conveyor belt 102 supported to the roof by non-illustrated chain blocks to provide a clearance envelope.

In a non-illustrated embodiment the support frame is adapted to engage a floor mounted rail. The support unit may in this instance have a trolley formation secured to the upright.

It will be understood that having an idler assembly with idler frames that are movable between an upright support position and a horizontal position for removal and replacement of idlers can be applied to conveyors in any industry, for example ports, grain terminals, overland conveyors or power stations.

Despite the above embodiments describing a "fixed" end (inbye of the installation point) as only travelling or being employed in a straight line, persons skilled in the art will understand from the above description that the embodiment conveyor systems can be readily adapted to negotiate corners. The embodiment conveyor systems are suitable for use to operate around corners both moving as a whole and stationary (with the conveyor operating). The section operating around curves may be a separate "fixed" section, or may be part of the one fixed unit. The particular arrangement employed will be a function of the type of idlers employed.

Although the above embodiments have been described with particular reference to underground mining applications, it will be understood that the conveyor system has broad application extending to any underground excavation setting such as in civil tunnelling applications (whether by tunnel boring machines (TBMs), drill/blast, roadheader excavation, pipe jacking or any other method) and where cut material must be conveyed from the active cutting area. In these settings the above conveyor system can be employed for conveying material around curves. Also, the conveying system is suitable for conveying a range of bulk materials including coal, stone, ore, potash, salt etc.

Although the invention has been described with reference to specific examples, it will be appreciated by those skilled in the art that the invention may be embodied in many other forms.

Various further non-illustrated alternative embodiments include the following features:

(A) A traction/haulage system for:
  moving the system along the monorail;
  providing a braking effect; and
  moving/relocating the system to another location within the mine;
(B) Lateral adjustment (across the mine roadway) of the support frames;
(C) Provision of the ability for the conveyor to 'swing' (in a pendulum/side-to-side motion across the heading) in reaction to forces from the movement of the belting/tension on the conveyor belt instead of the conveyor tracking off;
(D) Provision of the ability for the support frames to remain in a true vertical position even on sloping grades (up or down);
(E) Provision of the ability for the support frames to be turned (rotated about a vertical axis) for access to components;
(F) Provision of adjustment for the tracking of the belting (ability to manually adjust idlers to adjust/control the tracking of the belting);
(G) Provision of a self-tracking mechanism to 'automatically' track the belting on the idlers;
(H) Inclusion of a guidance system for escape in limited/zero visibility;

(I) Secondary service system (pipes, cables and communications) on a second monorail for the transport and use of services;
(J) Self-escape system (monorail-hung escape apparatus) for the self-escape of mine workers in an emergency;
(K) Provision of a roof and side bolting apparatus (hung from the main monorail or from a secondary monorail on both/or the walk and non-walk side of the conveyor; and
(L) A lateral adjustment system for:
moving the system along the monorail;
providing a braking effect; and
moving/relocating the system to another location within the mine.

The invention claimed is:

1. A support frame for a conveyor system, the support frame comprising:
an upright longitudinally extending between an operative lower end and an operative upper end;
a cross member extending outwardly from the upright between an upright end and a trolley end, the cross member including a trolley located towards the trolley end of the cross member and which the trolley is operatively adapted to suspend the upright from an overhead rail; and
an idler assembly including a carry belt idler shaft cantilevered from the upright, and a return belt idler shaft cantilevered from the upright and parallel to the carry belt idler shaft, wherein the support frame forms a substantially 'E' shape, with the upright providing a vertical leg of the 'E' shape and the cross member, carry belt idler shaft, and return belt idler shaft providing horizontal legs of the 'E' shape.

2. The support frame of claim 1, wherein the upright comprises a first upright member and a second upright member telescopically coupled to the first upright member.

3. The support frame of claim 2, wherein the upright includes an adjustment mechanism means adapted to provide longitudinal adjustment of the first upright member relative to the second upright member.

4. The support frame of claim 1, wherein the trolley includes a trolley body which supports at least one pair of opposing wheels.

5. The support frame of claim 1, wherein the trolley includes four pairs of opposing wheels.

6. The support frame of claim 1, the idler assembly includes a carry belt idler frame supporting a number of carry belt idlers.

7. The support frame of claim 1, including a carry belt idler shaft attachment formation fixed to the carry belt idler shaft and adapted to slidably engage a complimentary carry belt idler frame attachment formation fixed to a carry belt idler frame.

8. The support frame of claim 7, wherein the carry belt idler frame attachment formation is pivotally mounted about the carry belt idler shaft allowing the carry belt idler frame to be selectively located between an upright support position and a horizontal position.

9. The support frame of claim 1, wherein the idler assembly includes a return belt idler frame supporting a number of return belt idlers.

10. The support frame of claim 9, wherein the return belt idler shaft includes a return belt idler frame attachment formation adapted to slidably engage a complimentary return belt idler shaft attachment formation of the return belt idler frame.

11. The support frame of claim 10, wherein the return belt idler frame attachment formation is pivotally mounted about the return belt idler shaft allowing the return belt idler frame to be located in an upright support position and in a horizontal position.

12. The support frame of claim 1, further including a brace operatively adapted to secure the support frame to an adjacent support frame.

13. The support frame of claim 12, wherein the brace is pivotally attached to the carry belt idler shaft so as to be movable between an operative horizontal orientation and a stowaway upright position.

14. The support frame of claim 1, further including a support arm pivotally attached to the cross member so as to be movable between an upright stowaway position and an operative horizontal position.

15. The support frame of claim 14, wherein the support arm comprises a first arm member and a second arm member telescopically coupled to the first arm member.

16. A conveyor assembly comprising a plurality of the support frames of claim 1, the plurality of support frames being suspended from a monorail, the monorail having a conveyor support section supporting a conveyor belt and a recovery/installation section orientated in a direction transverse to the conveyor support section.

17. A support frame for a conveyor system, the support frame comprising:
an upright longitudinally extending between an operative lower end and an operative upper end;
a cross member extending outwardly from the upright between an upright end and a trolley end, the cross member including a trolley located towards the trolley end of the cross member and which the trolley is operatively adapted to suspend the upright from an overhead rail;
an idler assembly attached to the upright and operatively adapted to support a carry belt portion and a return belt portion of a conveyor belt; and
a brace operatively adapted to secure the support frame to an adjacent support frame, wherein the brace is pivotally attached to the carry belt idler shaft so as to be movable between an operative horizontal orientation and a stowaway upright position.

18. The support frame of claim 17, wherein the upright comprises a first upright member and a second upright member telescopically coupled to the first upright member.

19. A support frame for a conveyor system, the support frame comprising:
an upright longitudinally extending between an operative lower end and an operative upper end;
a cross member extending outwardly from the upright between an upright end and a trolley end, the cross member including a trolley located towards the trolley end of the cross member and which the trolley is operatively adapted to suspend the upright from an overhead rail;
an idler assembly attached to the upright and operatively adapted to support a carry belt portion and a return belt portion of a conveyor belt; and
a support arm pivotally attached to the cross member so as to be movable between an upright stowaway position and an operative horizontal position.

20. The support frame of claim 19, wherein the support arm comprises a first arm member and a second arm member telescopically coupled to the first arm member.

* * * * *